(12) United States Patent
Barenbrug

(10) Patent No.: US 8,588,514 B2
(45) Date of Patent: Nov. 19, 2013

(54) METHOD, APPARATUS AND SYSTEM FOR PROCESSING DEPTH-RELATED INFORMATION

(75) Inventor: Bart Gerard Bernard Barenbrug, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 540 days.

(21) Appl. No.: 12/599,362

(22) PCT Filed: May 5, 2008

(86) PCT No.: PCT/IB2008/051718
§ 371 (c)(1),
(2), (4) Date: Nov. 9, 2009

(87) PCT Pub. No.: WO2008/139351
PCT Pub. Date: Nov. 20, 2008

(65) Prior Publication Data
US 2010/0220920 A1     Sep. 2, 2010

(30) Foreign Application Priority Data

May 11, 2007   (EP) .................................. 07108071

(51) Int. Cl.
*G06K 9/00*        (2006.01)
(52) U.S. Cl.
USPC ........................................................ 382/154
(58) Field of Classification Search
None
See application file for complete search history.

(56) References Cited

U.S. PATENT DOCUMENTS

| 6,842,197 B1 | 1/2005 | Llach-Pinsach et al. |
| 2003/0066949 A1* | 4/2003 | Mueller et al. ............ 250/208.1 |
| 2003/0228034 A1 | 12/2003 | Fox et al. |
| 2005/0190180 A1 | 9/2005 | Jin et al. |
| 2005/0244071 A1 | 11/2005 | Zaharia et al. |
| 2006/0072790 A1 | 4/2006 | Wittebrood et al. |
| 2006/0088206 A1 | 4/2006 | Era |
| 2006/0268181 A1 | 11/2006 | Ernst et al. |
| 2009/0116732 A1* | 5/2009 | Zhou et al. .................... 382/154 |

FOREIGN PATENT DOCUMENTS

| WO | 2005060271 A1 | 6/2005 |
| WO | 2006003577 A1 | 1/2006 |

OTHER PUBLICATIONS

Tardini et al: "Shot Detection and Motion Analysis for Automatic MPEG-7 Annotation of Sports Videos"; Proceedings of the 13th International Conference on Imagage Analysis and Processing (ICIAP 2005), LNCS 3617, pp. 653-660.

Falkenhagen, L.: "Depth Estimation From Stereoscopic Image Pairs Assuming Piecewise Continuous Surfaces"; Proc. of European Workshop on Combined Real and Synthetic Image Processing for Broadcst and Video Production, Hamburg, Germany, Nov. 1994, 13 Page Document.

* cited by examiner

*Primary Examiner* — Nirav G Patel

(57) ABSTRACT

The invention relates to a method, apparatus and system for processing first depth-related information associated with an image sequence. The method of processing comprises mapping first depth-related information of respective images of a shot of the image sequence on corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and the amount of variation in the mapping for respective images in temporal proximity in the shot being limited.

23 Claims, 9 Drawing Sheets

METHOD, APPARATUS AND SYSTEM FOR PROCESSING DEPTH-RELATED INFORMATION

FIELD OF THE INVENTION

The present invention relates to a method of processing first depth-related information associated with an image sequence, comprising mapping first depth-related information on corresponding second depth-related information, an apparatus and a system for processing first depth-related information associated with an image sequence, comprising mapping first depth-related information on corresponding second depth-related information, a signal comprising first depth-related information associated with an image sequence, and a computer program product to be loaded by a computer arrangement, comprising instructions for processing first depth-related information associated with an image sequence, comprising mapping first depth-related information on corresponding depth-related information.

BACKGROUND OF THE INVENTION

With the development of autostereoscopic displays, rendering of three-dimensional imagery without the need for special headgear or glasses has become a reality. At present, autostereoscopic displays may already utilize different technologies; these technologies include for example flat-panel displays fitted with so-called lenticular lens foils and flat panel displays fitted with so-called parallax barriers.

Autostereoscopic displays provide facilities for the generation of different views for different viewing angles. Typically an autostereoscopic display is arranged to generate a left image for the left eye of a viewer and a right image for the right eye of a viewer. By displaying appropriate images, i.e. appropriate from the viewpoint of the left and right eye respectively, it is possible to convey an impression of a three-dimensional representation to the viewer.

A variety of techniques can be used to create and/or generate images for such autostereoscopic displays. For example multiple images can be recorded using multiple cameras the position of which corresponds with the respective viewpoint of a view for the autostereoscopic display. Alternatively, images may be computer-generated for each of the respective views, using a three-dimensional computer model.

However, in order to maintain backwards compatibility and improve on bandwidth usage it is preferred to use an input format for an autostereoscopic display that comprises an image sequence, similar to a conventional image sequence, and an accompanying depth map sequence. The autostereoscopic display then generates the respective images required, using images from the image sequence and the corresponding depth maps.

A depth map typically comprises multiple values indicative of the distance between the object(s) depicted in the image and the (possibly virtual) camera position. A depth map can be pixel-based, i.e. pixels in the depth map indicate the depth of pixels in the image. Alternatively, depth information can be object-based, i.e. the depth values are indicative of the distance of groups of pixels.

It is known to derive depth maps from stereo images obtained using e.g. a stereoscopic camera. Here the depth of a point generally refers to the distance between the object represented in a (group of) pixel(s) of the image and the plane through the point and perpendicular to the optical axis of the camera. Differences in viewpoint between each of the views of a stereoscopic camera can be used to establish depth information. The depth value of a (group of) pixel(s) in one image can be determined from the amount of translation of the position of a corresponding (group of) pixel(s) in the other image.

In fact, when the image is obtained by point projection, the translation is proportional to the amount of displacement of the camera and inversely proportional to the depth of the (group of) pixel(s). Using both views of a stereoscopic camera, a so-called disparity map can be generated indicative of the translation or displacement of a (group of) pixel(s) in either image. As a result of the aforementioned relationship this translation displacement or disparity data is in fact depth-related information. Throughout the text, depth-related information is to be understood to comprise both depth information and disparity information.

To convert stereo images into disparity data, a window-based matching approach can be applied to establish a measure of translation. Accordingly, the pixel values in a window around a pixel in a first image having a first orientation of the camera are compared to the pixel values in a window around a pixel in a second image having a second orientation. Matching here typically involves determining an aggregate of differences between the pixel values of the pixels in the matching windows.

A method for determining a depth-map using a stereoscopic image pair is disclosed in "Depth Estimation from Stereoscopic Image Pairs Assuming Piecewise Continuous Surfaces", by L. Falkenhagen, published in Proc. of European Workshop on combined Real and Synthetic Image Processing for Broadcast and Video Production, Hamburg, November 1994.

When an image sequence and associated first depth-related information are used as input for an autostereoscopic display, multiple views have to be generated either by the autostereoscopic display or by a device providing input to the autostereoscopic display. Three-dimensional display technologies however tend to have technology-specific requirements. For example the maximum allowable translation, i.e. disparity, of pixels on an autostereoscopic display is substantially more limited than that for shutter glasses. This is attributable to the fact that the amount of crosstalk between respective views in an autostereoscopic display is substantially higher than for the respective views of shutter glasses. As a result, there is a need for providing depth-related information in a manner that can accommodate such technology-specific requirements.

SUMMARY OF THE INVENTION

It is an object of the present invention to improve on the prior art and provide a method of processing first depth-related information associated with an image sequence, comprising mapping first depth-related information onto corresponding second depth-related information, said method being capable of taking into account such differences between displays.

This object is achieved by means of a method of processing first depth-related information associated with an image sequence, comprising mapping first depth-related information of respective images of a shot of the image sequence on corresponding second depth-related information, using a first estimate of a characteristic of the distribution of depth-related information associated with at least one image from the shot, the mapping adapting the first depth-related information by enhancing the dynamic range of a range of interest of first depth-related information defined at least in part by the first estimate, and the amount of variation in the mapping for respective images in temporal proximity in the shot being limited.

Although it is possible to convert disparity information or depth information associated with an image sequence without taking into account differences within shots, this may result in an unsatisfactory depth perception on an autostereoscopic display in particular in shots where the depth-related information does not span the entire depth-related information value range of the entire image sequence.

To improve on the above, the present invention proposes to perform a mapping of first depth-related information onto second depth-related information on a per shot basis, whereby the dynamic range of a range of interest of the first depth-related information is enhanced. The range of interest in turn is defined at least in part by a first estimate of a characteristic of the distribution of first depth-related information associated with at least one image from the shot.

In this manner the present invention may be used to enlarge the dynamic range of the range of interest relative to other parts of the input range, based on characteristics of the distribution of the first depth-related information in the shot itself. By limiting the amount of variation between respective images in temporal proximity within the shot, the present invention moreover preserves continuity of the mapping throughout the shot.

It is an insight of the inventor that continuity of the mapping between images within a shot is more relevant than that between shots. In accordance therewith the inventor proposes to limit the variation in the mapping for respective images in temporal proximity in the shot, thereby preserving continuity within the shot.

In the above manner, the present invention allows enhancement of the range of interest of first depth-related information, thus enabling the present invention to be used to e.g. provide a more efficient use of the relatively narrow disparity range of an autostereoscopic display, thereby accommodating for the requirements of an autostereoscopic display.

In an embodiment, the second depth-related information is first depth information, and enhancing the dynamic range of the range of interest of first depth-related information comprises allocating a larger fraction of a first depth range to the range of interest than according to the relationship between the depth-related information and the depth of objects in the image.

In an embodiment, the second depth-related information is first disparity information, and enhancing the dynamic range of the range of interest of first depth-related information comprises allocating a larger fraction of a first disparity range to the range of interest than according to the relationship between the depth-related information and the disparity of objects in the image.

In an embodiment, the first depth-related information is second disparity information. The second disparity information may e.g. be obtained through analysis of images from a stereoscopic camera. In another embodiment, the first depth-related information is second depth information that may e.g. be obtained using a laser range finder. In another embodiment, the first depth-related information is further depth information that is derived from disparity information by processing the disparity information, using a pinhole camera model. In either case the first depth-related information is subsequently mapped in accordance with the present invention on second depth-related information.

In an embodiment, the maximum amount of variation in the respective mappings used for adjacent images is upper-bound by a predetermined threshold. The amount of tolerable variation between different mappings of respective images within temporal proximity in a shot can be quantified and limited in various ways. In one embodiment, the differences between respective mappings may be described as the integral of the absolute differences between respective second depth-related information values over the entire first depth-related value range.

When limiting the amount of variation between adjacent images, using a pre-determined threshold, some variation between the respective mappings is allowed. This in turn enables tracking of gradual changes within a shot. Alternatively the predetermined threshold can be set to zero, thereby warranting continuity in the mapping of first depth-related information within the shot, but also preventing the ability to adapt to gradual changes. Although a threshold of zero can be used to enhance even shots with substantial variations in the first depth-related information distribution, this may not always be possible without clipping. Consequently, the enlargement in the dynamic range for such shots may be low. In this manner, selection of the threshold value enables a tradeoff between continuity and dynamic range enhancement for more dynamic shots.

In shots that have a limited variation in the distribution of first depth-related information values it suffices to use information from a single image of the shot for establishing the first estimate. However, accuracy of the first estimate can be improved, particularly for more dynamic shots, by using contributions from multiple images in the shot, preferably the first and last image from the shot, or alternatively by using all images in the shot.

In a further embodiment, the first estimate is based on temporally filtered first depth-related information from the shot. In this manner, noise and transient related aberrations can be reduced.

In an embodiment, the first estimate is based on weighted first depth-related information, wherein the weight factors are based on reliability information, the reliability information being indicative of the reliability of the first depth-related information. In particular when generating first depth-related information for existing 2D content using a 2D to 3D conversion process, the reliability of the first depth-related information may not be uniform over all images within a shot. For example, as a result of start-up effects and/or error propagation, reliability can be low early on/at the end of the shot. In such a situation it is particularly advantageous to weight the contribution of depth-related information values to the first estimate, using reliability information pertaining to the depth-related information values.

In a further embodiment, classifying information is obtained for the shot and is subsequently used to adapt the mapping for respective images of the shot, based on the classifying information. Classifying information is often a by-product of automated shot-cut detection techniques, as this information enables the partitioning of the image sequence into shots. This classifying information may be used to tune the mapping to the shot-type, thereby enabling tracking of variations in first depth-related information in a shot, such as e.g. in a zoom-type shot.

Classifying information may also be a used in combination with substantially static shots. The classifying information may be used as an indicator to further limit the amount of variation for static shots. A priori knowledge of the shot-type may also enable a more efficient determination of the first estimate. In case of a substantially static shot having only limited variation in the first depth-related information distribution, the first estimate may be based on first depth-related information associated with any single image of the shot.

In another embodiment, the first estimate is based on first depth-related information values located in a first image region, and a second estimate of a characteristic of the distribution of depth-related information associated with at least one image from the shot is based on first depth-related information values located in a second image region; the second image region being located near the borders of the image. The second estimate in this embodiment can be used to detect whether there are any objects close to the image border that are nearby. This information is relevant for reducing or preventing so-called window violations.

Window violations typically occur when objects that are relatively close to the viewer are located near borders of the display. When generating multiple views for use with e.g. an autostereoscopic display, the displacement of the nearby objects can position the object on and/or beyond the display border. As a result, a situation may occur wherein the object is visible in one of the views but not (entirely) in the other. For objects whose depth values are such that the objects are positioned "behind" the display boundary, the occlusion of the object by the display boundary will be perceived as being natural. However, for objects whose depth values are such that the objects are positioned "in front" of the display boundary, this occlusion phenomenon will appear artificial. The latter situation is referred to as a window violation.

The second estimate may be used to detect such situations. The second estimate can be used to establish when nearby objects, i.e. objects whose depth values correspond to those of objects in front of the actual display, are displayed on the display spatially near an image border. Consequently, on detection of such a situation window violations may be prevented by moving all objects within a shot to more "distant" second depth-related information values, effectively moving all objects away from the user, behind the display boundaries in order for the occlusion by the display border to be perceived as natural. In the process the remaining second depth-related value range that does not cause window violations can be used to enhance the range of interest as indicated by the first estimate. In this manner, use of the second estimate may substantially reduce the probability of, or even prevent, window violations.

It is a further object of the present invention to provide an apparatus and a system for processing first depth-related information associated with an image sequence, comprising mapping first depth-related information of the image sequence on corresponding second depth-related information, the apparatus and the system being capable of accommodating for differences between different types of three-dimensional displays.

This object is achieved using an apparatus and a system according to claims 13 and 14, respectively.

The present invention further relates to a signal for use in such a system, as well as software for implementing a method according to the present invention.

BRIEF DESCRIPTION OF THE DRAWINGS

These and other advantageous aspects of the invention will be described in more detail, using the following Figures.

The Figures are not drawn to scale. Generally, identical components are denoted by the same reference numerals in the Figures.

DETAILED DESCRIPTION OF EMBODIMENTS

Although the present invention may be used in an advantageous manner for processing depth-related information for autostereoscopic displays, the present invention is not limited thereto and may also be applied in other applications that involve processing of first depth-related information associated with an image sequence.

Figure 1A:
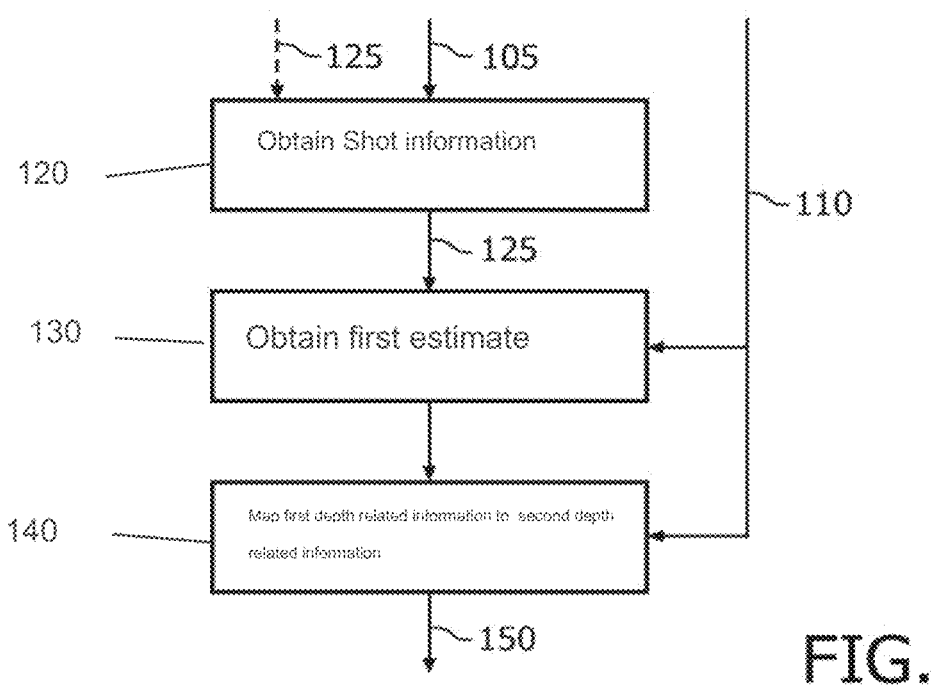
FIG. 1A shows a flowchart of an embodiment of the present invention.

FIG. 1A shows a flowchart of a method according to the present invention. In this method first depth-related information 110 associated with an image sequence 105 is mapped on corresponding second depth-related information 150 associated with the image sequence 105.

In a first step 120, shot information 125 is obtained that classifies multiple sequential images from the image sequence 105 as a shot. Here, the verb "to obtain" is to be understood to comprise: determining shot information 125 using the image sequence and/or the associated depth information as well as receiving such shot information 125 (as indicated by the dashed arrow), e.g. in the form of metadata provided along with the image sequence. Such metadata may be generated automatically, but may also result from manual annotation of the image sequence. It will be clear to the skilled person that the source of the information is of less interest than whether the shot information 125 accurately demarcates the start and end of shots.

The process of determining shot information 125 is well known in the art. Reference is made to US patent application US2006/0268181 entitled "Shot-cut detection", which is in the name of the same applicant and considered to be incorporated herein by reference. The shot-cut detection method presented therein is intended to enable automated shot-cut detection and can be advantageously combined with the present invention. Further reference is made to the paper "Shot Detection and Motion Analysis for Automatic MPEG-7 Annotation of Sports Videos", by Giovanni Tardini, et al, considered to be included herein by reference, published in Proceedings of the 13$^{th}$ International Conference on Image Analysis and Processing (ICIAP 2005). This paper discloses an automated process for performing shot cut detection and annotation.

In a further step 130 a first estimate 135 is obtained of a characteristic of the distribution of first depth-related information 110 values associated with at least one image from the shot. The first estimate 135 can be determined using the first depth-related information associated with at least one image from the shot; alternatively it may be provided as metadata resulting from a prior determination process.

The first estimate 135 provides information pertaining to the distribution of the first depth-related information of at least one image of the shot. In one variant of the embodiment shown, the first estimate represents the mean of the distribution of first depth-related information values associated with at least one image of the shot. The first estimate can be used to determine which values of the first depth-related information should be classified as being within a range of interest, and which values should be classified as outliers.

By way of example, the first estimate might be a mean of the first depth-related information values within an image of the image sequence. This value can be perceived as an estimate of the mean of first depth-related information values within the shot and, within this context, can be used to define the bounds of the range of interest in a balanced manner around the mean. For example, the range of interest might be defined as being 60% of the full range of the first depth-related information balanced around the mean. In the case of a mean value of 40 in a range of [0,99] this would result in a range of interest of [10,70].

In the final stage of the embodiment shown in FIG. 1A, first depth-related information values associated with images in the shot are mapped in step 140 on second depth-related information values by enhancing the dynamic range of the range of interest of first depth-related information defined at least in part by the first estimate. In this manner, the present invention favors the representation of the range of interest of the first depth-related information in the mapping, by allocating a larger fraction of the available range of second depth-related information values to the range of interest in comparison with ranges outside the range of interest; the range of interest being at least in part based on the first estimate 135.

Although the present invention may be used to map disparity information of an image sequence onto depth information for use in conjunction with the image sequence, the present invention may also be used to map first depth information onto second depth information, thereby favoring the range of interest of the first depth information in the mapping process. In fact the present invention may be used for mapping:
   depth information onto enhanced depth information;
   depth information onto enhanced disparity information;
   disparity information onto enhanced disparity information; or
   disparity information onto enhanced depth information.

In a variant of the above embodiment, the range of interest may be defined using a first estimate 135 comprising two parameters being the mean $\mu$ and variance $\sigma$ of a Gaussian model of the distribution of first depth-related information values of the first and the last image from the shot. In this particular case the first estimate 135 may be used to establish the range of interest as being the first depth-related information values in the range $<\mu-2\sigma, \mu+2\sigma>$.

In a further variant, the first estimate 135 is a histogram of first depth-related information values associated with the at least one image from the shot. When the shot is a static shot, that is a shot with little variation in the distribution of first depth-related information values, it would suffice to establish a histogram based on a single image, i.e. any image from within the shot. Optionally the histogram may even be based on a subset of first depth-related information values from any of the images in the shot. However, it will be clear to the skilled person that by using a subset of first depth-related information values, the computational load may be reduced at the cost of accuracy. By discarding part of the first depth-related information, the estimate may no longer reflect the distribution of first depth-related information values with a sufficiently high accuracy to enable correct enhancement.

Alternatively, if the shot is of a more dynamic nature such as a pan or a zoom, the histogram may need to span first depth-related information values from multiple images from the shot. Preferably, the histogram is based on the first and the last image in the shot, but optionally information from even more images may be used. In order to provide a robust solution, the histogram could be based on contributions from all images in the shot.

The use of a histogram is particularly advantageous in combination with the present invention as depth-related information generally does not have a Gaussian distribution. Objects within a shot may be scattered, i.e. distributed in a highly irregular manner; the use of a histogram instead of a model based on e.g. a Gaussian distribution can reflect such a distribution in a more accurate manner.

The histogram in turn can be used to define the range of interest e.g. by excluding the highest 10% and the lowest 10% of the values used. Alternatively, if the histogram is highly asymmetric, the normalized mean $\hat{\mu}$ can be used to obtain a more balanced cut-off. In this case the outliers may e.g. be defined as the lower $\hat{\mu} \cdot 20\%$ and the upper $(1-\hat{\mu}) \cdot 20\%$ of the values of the full range of the first depth-related information values used. It will be clear to those skilled in the art that many variations can be envisaged that use other types of statistical and/or mathematical models and parameters that characterize distributions in order to establish the range of interest of first depth-related information values in the shot.

Although the present invention may be used in an advantageous manner for converting disparity information to enhanced depth information, it can also be used for converting disparity information into enhanced disparity information, depth information to enhanced depth information, and depth information into enhanced disparity information. Typically, the term enhancing here relates to enhancing the dynamic range of a range of interest in the first depth-related information by allocating a larger fraction of a second depth-related information range to the range of interest than based on the actual relationship between the first depth-related information and the second depth-related information.

Figure 1B:
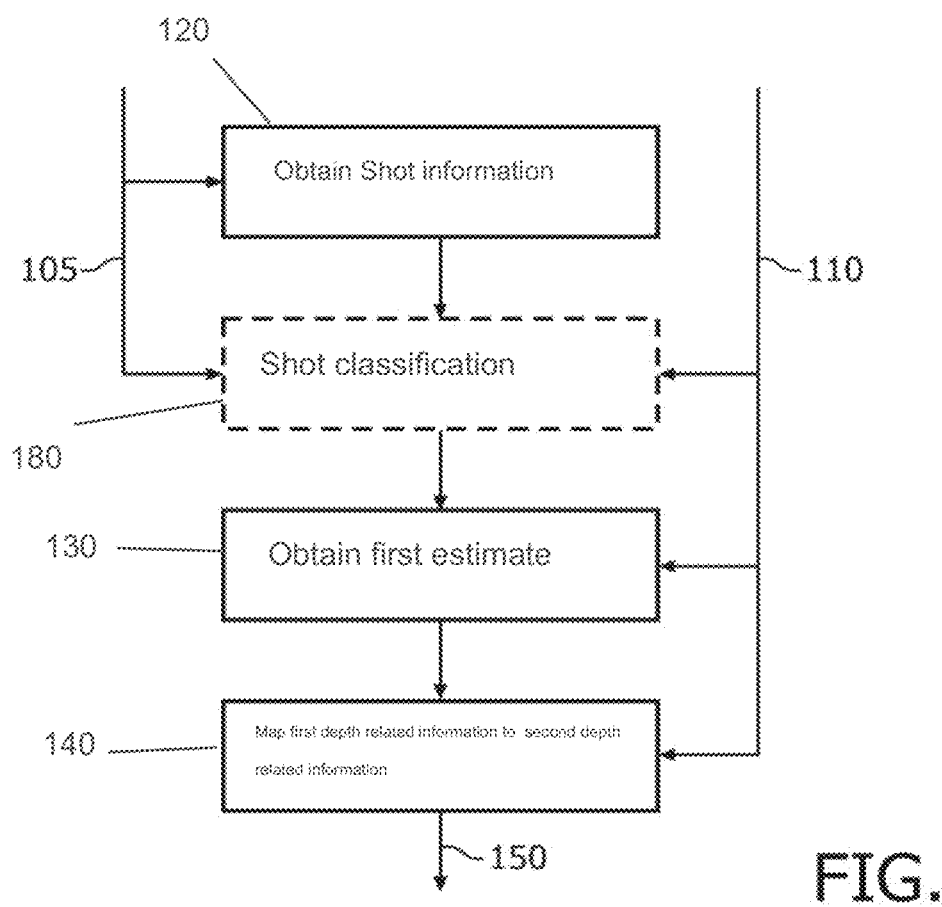
FIG. 1B shows a flowchart of an embodiment of the present invention including a step for shot classification.

FIG. 1B shows a flow chart of a method according to the present invention that comprises a step 180 for shot classification. Techniques for shot cut detection and classification are known to those skilled in the art. Reference is made to US patent application US 2006/0072790 entitled "Background motion vector detection", which is in the name of the same applicant and included herein by reference. This patent application discloses a method for establishing global motion vectors that may be used in shot classification. In addition reference is made to "Shot Detection and Motion Analysis for Automatic MPEG-7 Annotation of Sports Videos", by Giovanni Tardini et al, included herein by reference, published in Proceedings of the 13th International Conference on Image Analysis and Processing (ICIAP 2005), which discloses an automated process for performing shot cut analysis and shot annotation that may be advantageously combined with the present invention.

The embodiment in FIG. 1B illustrates how the outcome of the shot detection step 120 can be used in a further step 180 of classifying the shot in question, e.g. by determining whether the shot is substantially static or substantially dynamic, i.e. based on the fact whether or not there is any substantial variation in the first depth-related information within the shot. It will be clear to the skilled person that many methods for automatic shot detection in fact analyze images in an image sequence in order to classify respective images as belonging to a particular shot. This analysis may e.g. also indicate a particular shot-type such as zoom-in, zoom-out, pan-left, pan-right, pan-up, and pan-down. Alternatively, further parameters may be established. It will be clear from the above that the steps 120 and 180 as presented in FIG. 1B may in fact be advantageously combined in a single shot cut detection and classification step.

Once classifying information is available, it can be used to handle the shot accordingly. Consider e.g. a shot wherein the camera zooms out from the face of a lone rider as he rides off towards the horizon. This shot classifies as a dynamic shot in that the range of interest at the start of the shot is different from that at the end of the shot.

Such a dynamic shot could be handled in substantially the same manner as a static shot, i.e. by establishing an accurate first estimate 135 of the distribution of the first depth-related information associated with one or more images of the shot, and subsequently mapping it according to the present invention. However, as a dynamic shot typically comprises a relatively broad range of first depth-related information values, typically broader than that of a static shot, the potential for improvement is more limited than for static shots.

However, by using the classifying information the present invention can be further refined, so as to gradually adapt the mapping for subsequent images in the shot, based on the classifying information. In this manner a trade-off is possible between continuity in mapping and depth enhancement.

The inventor realized that the continuity within the mapping process of images within a shot is important. However, continuity does not necessarily require the use of a single mapping for all images in a shot. Instead, limiting the variation in respective mappings of images within temporal proximity allows a gradual variation in mapping between respective images, resulting in a substantially continuous enhancement process. The process allowing some variation does enable an improved enhancement over an approach that uses a single mapping for the entire shot, corresponding with a fixed zero variation threshold.

Although gradual variation may be limited by means of fixed pre-determined threshold values for all shot types, the availability of classifying information enables a refined threshold selection process. Consequently, a substantially static shot may benefit from a comparatively small or even zero threshold value, whereas a more dynamic shot-type such as a zoom, may benefit from a higher threshold, enabling tracking of larger variations within the shot.

Figure 6:
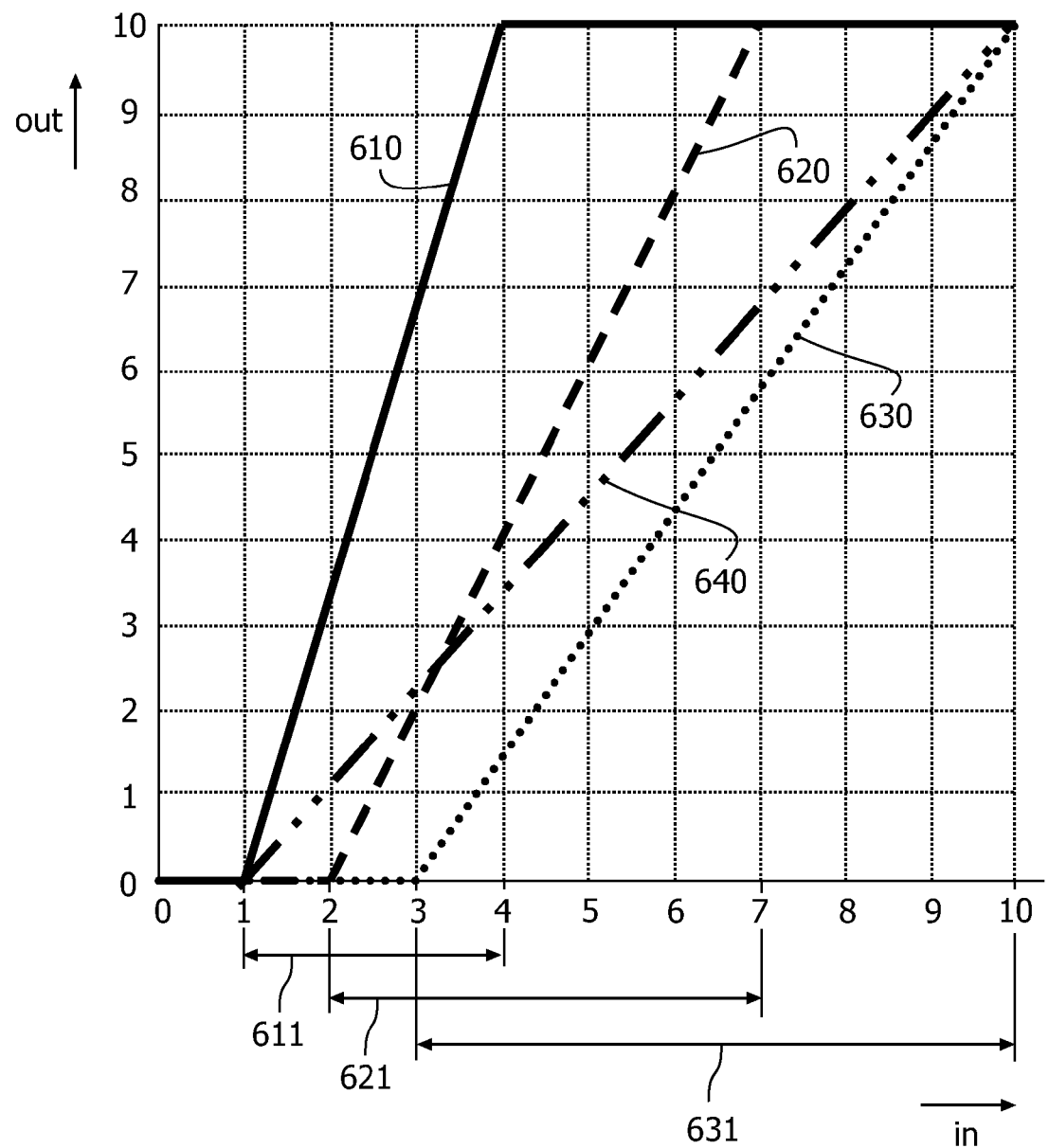
FIG. 6 shows a graph illustrating the use of shot classification to accommodate for a zoom-out type of shot.

FIG. 6 shows a graph of four mappings of first depth-related information onto second depth-related information according to the present invention. On the x-axis the first depth-related values are represented, on the y-axis the corresponding second depth-related values are represented. The curves 610, 620, and 630 reflect an idealized scenario of a shot wherein the camera zooms. The curve 610 represents the mapping for the first image of the shot, the curve 620 represents the mapping for an image halfway through the shot, and the curve 630 represents the mapping for the last image of the shot.

In this shot the range of interest in the first image, as indicated by the subrange 611, is substantially smaller than the range of interest for the last image in the shot, as indicated by the subrange 631. In accordance with the present invention, the dynamic range of the range of interest is enhanced, in this case it is stretched to cover the full output range of the second depth-related information values, while first depth-related values outside of the range of interest are clipped to 0 or 10.

The classifying information corresponding to the shot provides an indication that a substantial variation in the range of interest is to be expected. Moreover, as the shot is classified as a zoom-out it will be clear that the range of interest in the last image is likely to be substantially larger than that in the first image. This information can be used even when only a single image of the shot is used to establish the first estimate. In case the first image is used, the range of interest is likely to grow, whereas in case the last image is used, the range of interest is likely to have grown. By using two images from the shot, preferably the first and the last shot, an even better prediction can be made.

Note that even when this shot would be handled as a static shot, and information from both the first and the last images of the shot were used to establish a first estimate in the form of a histogram of first depth-related values, this could result in a mapping along curve 640. In spite of the fact that this would not result in the same improvement as the embodiment that uses classifying information, it would provide an improvement in depth perception when the resulting second depth-related information is used as input for an autostereoscopic display, compared to the situation where the first depth-related information is used as input.

Figure 1C:
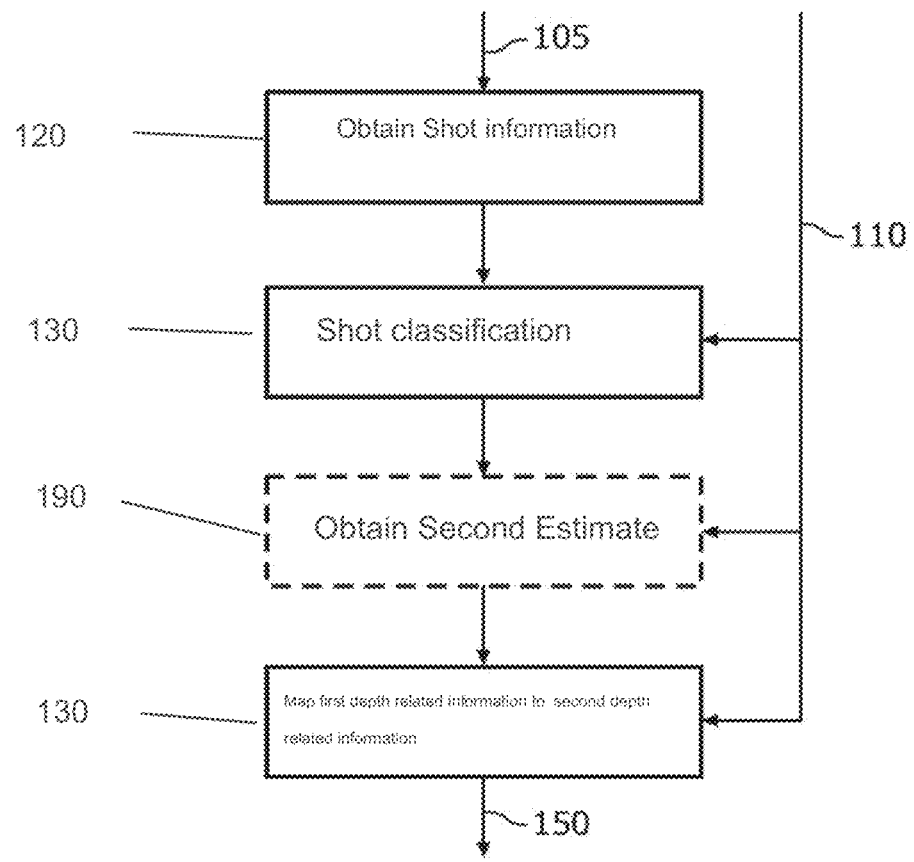
FIG. 1C shows a flowchart of an embodiment of the present invention including a step for obtaining a second estimate.
Figures 2A, 2B:
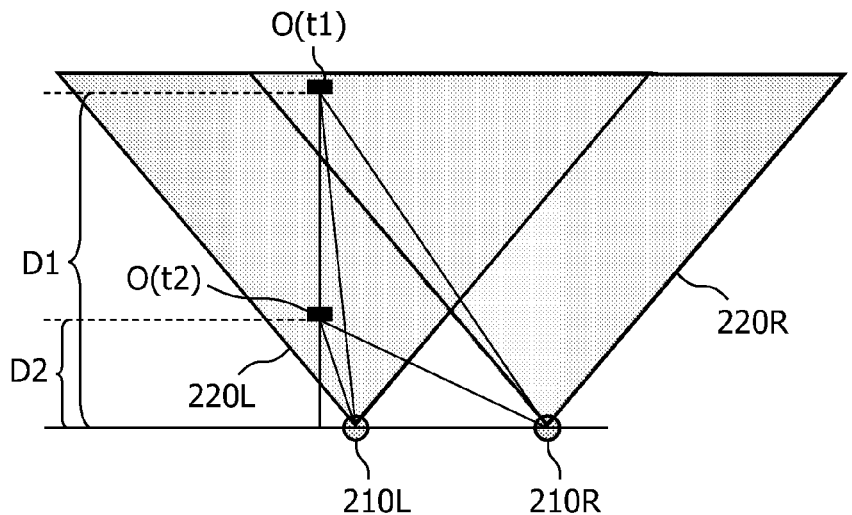
FIG. 2A shows a top-down view of two view cones with an object at two respective depth values.
FIG. 2B shows the occurrence of a window violation.

FIG. 1C shows a flowchart of an embodiment of the present invention including a step for obtaining a second estimate in order to prevent window violations. FIG. 2A and 2B illustrate the occurrence of a window violation. Two cameras 210L and 210R observe a scene. The cameras 210L and 210R register what is visible within the view cones 220L and 220R respectively. At time t1 an object indicated by O(t1) is located at a distance indicated by D1. The resulting images as registered by the cameras are shown in FIG. 2B as 230 and 240 for the cameras 210L and 210R respectively. At time t2 an object indicated by O(t2) is located at a distance D2, i.e. much closer to the camera setup. The resulting images as registered by the cameras are shown in FIG. 2B as 250 and 260 respectively.

The object as observed by camera 210L is visible in both left eye images 230 and 250. In image 250 the object has grown in size due to the closer proximity, but in addition has moved to the left, towards the image border. The situation for the right eye views 240 and 260 as observed by camera 210R is slightly different. The object O(t1) is visible within image 240 and is located near the left image border. Similar to the situation for camera 210L, the object O(t2) would have grown in size as a result of the closer proximity, and moreover would have moved to the left. However, as a result of the fact that the object O(t2) is substantially closer, the object has moved so much to the left that it has moved out of the view cone of camera 210R, and as a result falls outside of the right eye view 260.

A similar situation may occur when an autostereoscopic display renders images based on an image sequence, e.g. the image sequence of the left eye camera of FIG. 2B and associated depth information. The generation of views based on the image sequence and depth data is effectively the inverse of establishing depth from disparity information. The generation process involves translating objects in the image according to their position relative to the camera. Assume that the dashed line 200 is the zero disparity plane, corresponding to the position of the autostereoscopic display. When generating the right eye view for O(t2), the object as seen in the left eye view for O(t2) has to be translated in accordance with both depth and relative camera position. Starting from the left eye view and the depth information, the object O(t2) would have to be translated to the left in order to obtain the right eye view. However, for the right eye view the object would have to be translated beyond the image boundaries of the right eye view 260; this is not possible, and as the object is perceived as being located between the display and the camera, a window violation is said to occur.

Window violations occur when an object, as a result of the corresponding depth, is located between the display area and the (virtual) camera, and is too close to an image boundary. As a result the translation value or disparity of the object may be such that the translated object partially overlaps with a display border or is located completely outside of the display area. By carefully monitoring the distribution of first depth related values near the border of an image, such situations may be flagged. And in case such a situation occurs, the depth information of objects in the shot may be adapted, typically, by reducing the amount of translation/disparity for all objects in the shot.

By way of example, in case an object is relatively close to the image boundary it is possible to determine the maximum disparity value allowed for an object at that depth that allows the object to be correctly represented. In this manner it is possible to scale the depth or disparity information associated with the image sequence in such a manner that the resulting mapping will not cause window violations and/or the probability thereof is reduced.

In order to prevent window violations the exact relationship between the second depth-related information and the resulting disparity on the autostereoscopic display used has to be known. This relationship can then be taken into account when "moving" the objects in the shot further away from the camera. In case it suffices to reduce the probability, the requirement that the exact relationship is known may be relaxed.

Figure 2C:
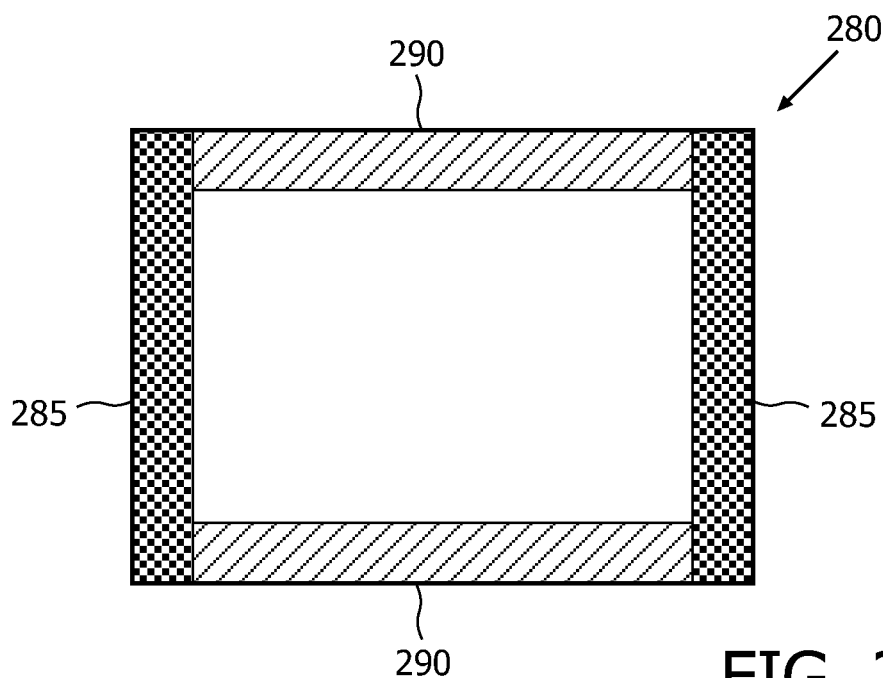
FIG. 2C shows various regions on a display.

In the embodiment shown in FIG. 1C, the first estimate is based on first depth-related information located in a first image region 280 as shown in FIG. 2C. The first image region 280 here, by way of example, comprises the entire image. In the embodiment in FIG. 1C, a second estimate is obtained in step 190, the second estimate being an estimate of a characteristic of the distribution of first depth-related information associated with at least one image from the shot, the first depth-related information used for establishing the second estimate being located in a second image region 285 near an image border as shown in FIG. 2C.

Although "obtaining" in step 190 comprises generating the second estimate, in an alternative embodiment the second estimate may be received as metadata accompanying the image sequence. In this scenario the metadata was generated based on the image sequence and the first depth-related information by means of an earlier generation process.

By using the second estimate it is possible to detect horizontal window violations originating from the second image region 285. Alternatively, the second image region may further comprise image region 290, as shown in FIG. 2C, thereby also allowing detection of vertical window violations if so required.

Figure 3:
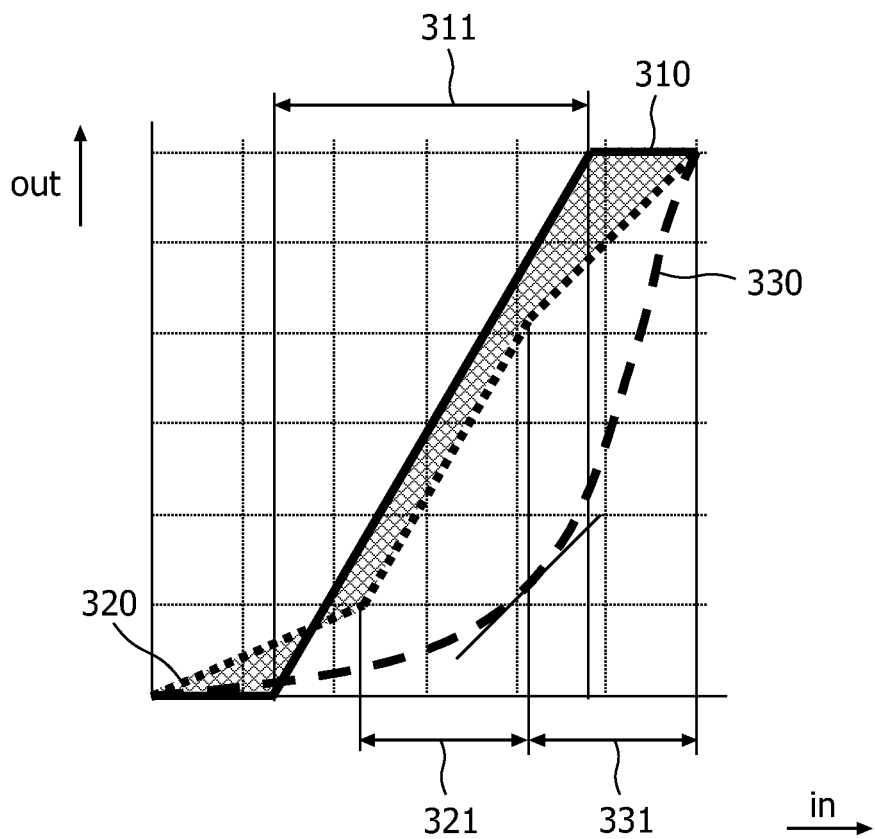
FIG. 3 shows several non-linear mappings.

FIG. 3 shows a graph wherein the x-axis represents first depth-related information values, and the y-axis represents second depth-related information values. Within the graph three curves 310, 320, and 330 are shown, each curve representing a mapping from first depth-related information to second depth-related information. For each of the curves the range of interest 311, 321 and 331, that is at the basis of the mapping, is shown.

Curve 310 illustrates a uniform stretch of the range of interest to the full range of the second depth related information range. Curve 320 illustrates a piece-wise linear mapping wherein the range of interest is allocated the relatively largest fraction of the second depth-related information range, while some of the depth information is preserved for the regions outside the range of interest. Finally, curve 330 illustrates a continuous curve wherein the first derivative of the curve for the range of interest is greater than one and outside of the range of interest smaller than one, thereby illustrating the fact that the range of interest once more is allocated a larger fraction of the range of second depth-related information values.

FIG. 3 also depicts a simple manner to quantify the amount of variation between respective mappings. The hatched area between the curves 310 and 320 effectively provides an indication of a measure of difference between both mappings. This difference measure may be used to limit the amount of variation between respective mappings of adjacent images within a shot.

Although this difference measure establishes the difference between the curves it does not take into account the number of depth values affected by respective differences in the mapping. An alternative difference measure which may be used when comparing the mapping between adjacent images weights the differences between the two curves with the fraction of pixels having a corresponding first depth-related information value. In case the first estimate is a histogram of the distribution of first depth-related information, this histogram can be used in the weighting process. The resulting difference measure once more provides an indication of the differences between the respective images.

Figure 4A:
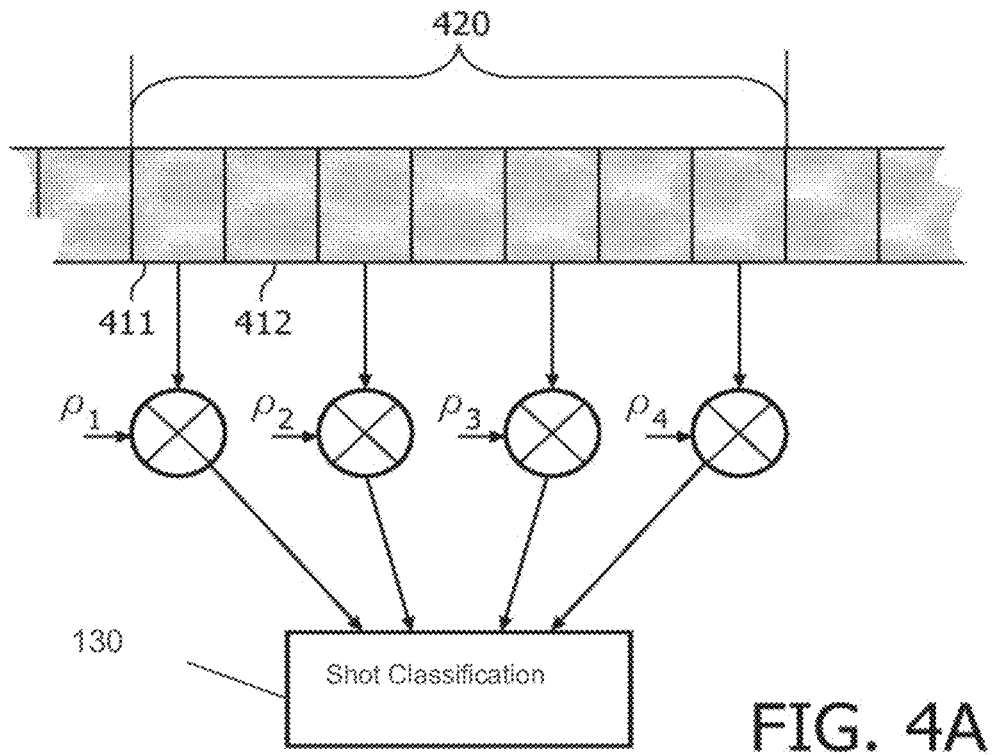
FIG. 4A shows temporal sub-sampling and weighting of first depth-related information.

FIG. 4A graphically illustrates a situation wherein only every other image from the shot 420 is used to establish 130 the first estimate. For example, the first depth-related information values associated with image 411 are used, whereas those associated with image 412 are not used. Moreover, the contribution from different images in the shot is weighted using reliability information $\rho 1$, $\rho 2$, $\rho 3$ and $\rho 4$ of the respective first depth-related information corresponding to the shot. The reliability information can be generated in the first depth-related information generation process, or may be the result of manual annotation.

Figure 4B:
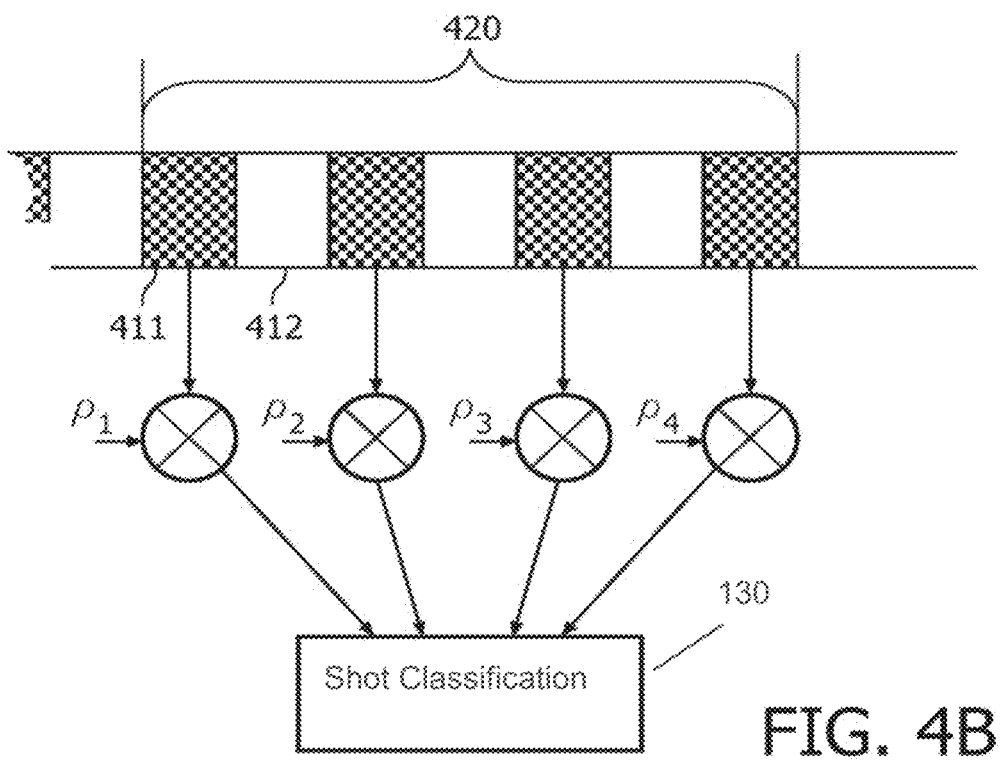
FIG. 4B shows spatial sub-sampling and weighting of first depth-related information.

FIG. 4B graphically illustrates a further refinement applying spatial sub-sampling, wherein only a subset of the pixels in the respective images, indicated by a checkerboard-pattern in the respective images, is used in the process of generating the first estimate 130.

Within a shot, variations in first depth-related information values may occur even if the camera position and settings are stable, e.g. as a result of objects moving in and out of the view of the camera. Such variations may be relevant for the shot. However, short variations of a transient nature may not be of interest for adapting the mapping. In order to prevent overadaptation, temporal filtering may be applied, wherein the first depth-related information values are preferably low passfiltered over time before the first depth-related information values are used for establishing the first estimate.

Figure 5:
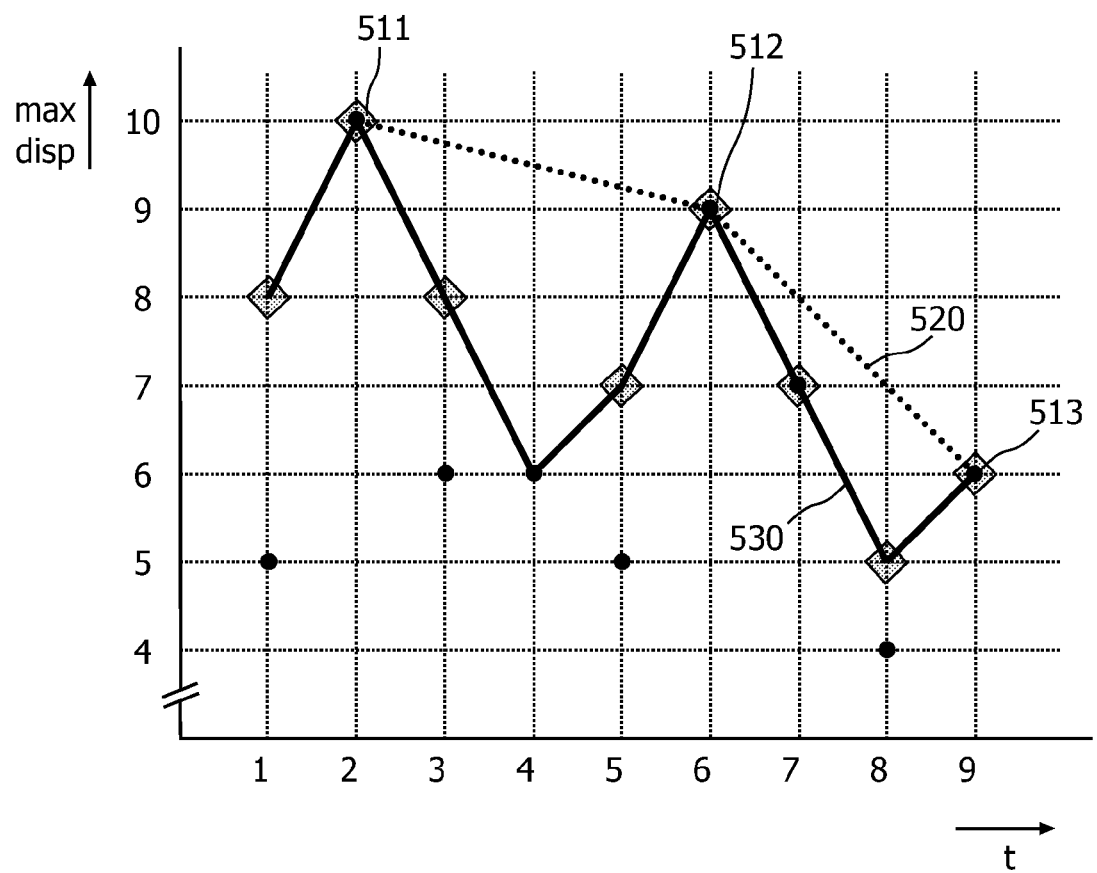
FIG. 5 shows a graph illustrating the use of a maximum disparity envelope.

Other approaches may be used for handling temporal variations, such as the approach presented in FIG. 5. FIG. 5 shows a graph illustrating an example wherein the first depth-related information is disparity information. On the x-axis of the graph discrete moments in time are represented corresponding with images in a shot. On the y-axis the maximum disparity value in the respective image is represented.

The maximum disparity value may be used in establishing the range of interest of the first depth-related information. By way of example, the range of interest may be defined so as to cover the minimum and maximum disparity values of the first depth-related information values in the shot. An enhancing of the range of interest may involve mapping the range of interest on the full range of second depth-related information values.

The maximum disparity values shown in FIG. 5 for subsequent moments in time are 5, 10, 6, 5, 9, 7, 4, and 6, respectively. In this example the variation in the maximum disparity between subsequent moments in time is limited to a maximum of 2. By limiting the maximum disparity value, the variation in the first estimate will be limited. Consequently, by limiting the variation in the first estimate the variation in the resulting mapping may also be limited.

The approach used in FIG. 5 consists in defining an envelope that includes the locally maximum disparity values over the range of disparity values, here indicated by the dotted line 520 that passes through the points 511, 512, and 513. The points on this line are maintained as is. Subsequently the maximum disparity values at other moments in time are determined starting from the local maxima towards the actual maximum disparity value, meanwhile respecting the maximum difference threshold. This results in the disparity values indicated using diamonds on the curve 530 that passes through the maximum disparity values of 8, 10, 8, 6, 7, 9, 7, 5, and 6, respectively.

The approach as presented in FIG. 5 indicates that the variation between mappings used for respective images in a shot can be limited in an indirect manner, in this case, by re-calculating a first estimate for respective images in the shot and limiting the variation between adjacent shots in the first estimate.

Figure 7A:
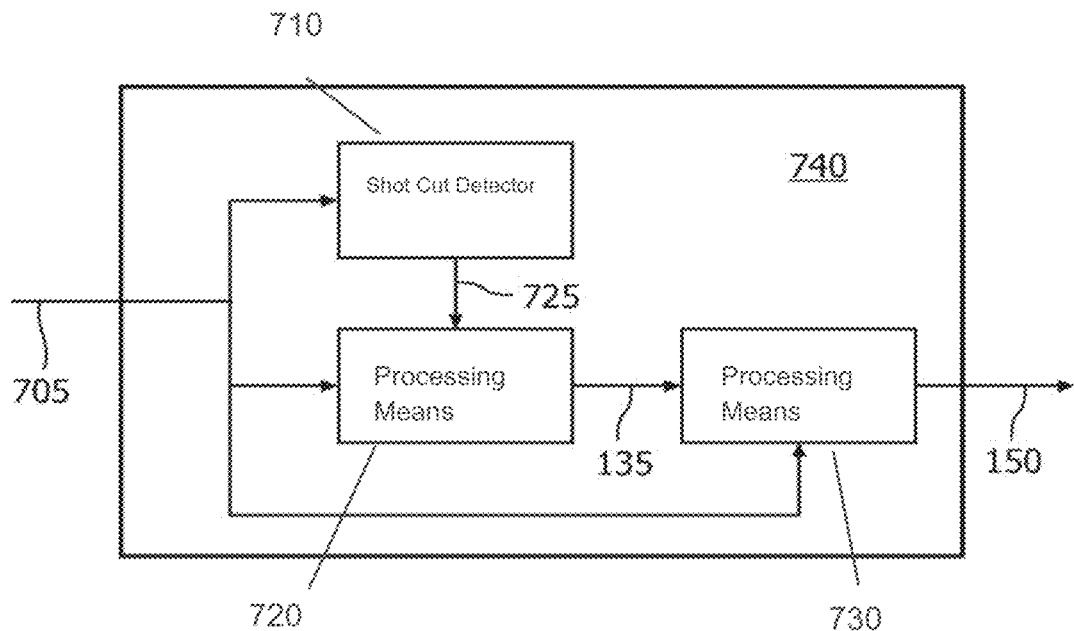
FIG. 7A shows an apparatus according to the present invention.
Figure 7B:
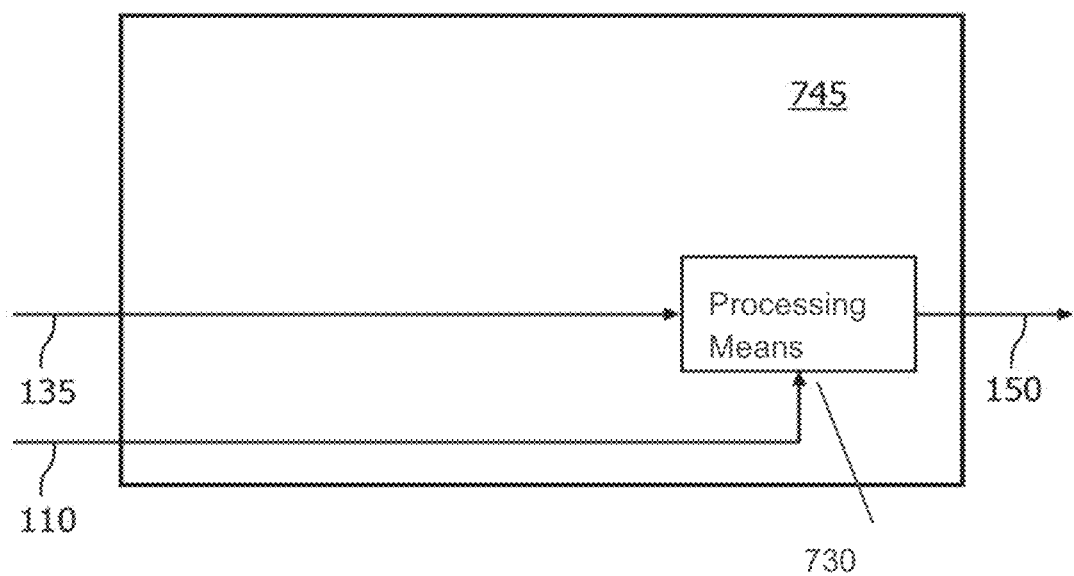
FIG. 7B shows a further apparatus according to the present invention.

FIGS. 7A and 7B each show an apparatus according to the present invention. The key difference is that the apparatus 740 in FIG. 7A receives an image sequence 105 and accompanying first depth-related information 110 in the form of a signal 705, whereas the apparatus in FIG. 7B receives the first depth-related information 110 and a first estimate 135 of a characteristic of the distribution of first depth-related information associated with at least one image from a shot.

Apparatus 740 receives the signal 705, and provides the image sequence 105 comprised therein to a shot cut detector 710. The shot cut detector provides shot information 725 to processing means 720. The processing means 720 in turn uses this information to process the first depth-related information comprised in the signal 705 in order to establish a first estimate 135 of a characteristic of the distribution of first depth-related information associated with at least one image from a shot.

The first estimate 135 in turn is used by processing means 730 to map first depth-related information 110 of respective images of the shot on corresponding second depth-related information 150, the mapping adapting the first depth-related information by enhancing the dynamic range of a range of interest of first depth-related information defined at least in part by the first estimate, and the amount of variation in the mapping for respective images in temporal proximity in the shot being limited.

In contrast, the apparatus 745 depicted in FIG. 7B effectively receives two input signals in the form of the first estimate 135 and the first depth-related information 110 for every image. In a variant of the embodiment shown in FIG. 7B the apparatus 745 further receives shot information for use by the processing means 730. It will be clear to the skilled person that further variants may be constructed within the scope of the present invention, such as a variant wherein all image-specific parameters for mapping the depth-related information 110 of an image of a shot are provided as metadata to the apparatus 745 on a per-image basis. The processing means 730 subsequently maps the first depth-related information 110 onto corresponding second depth-related information 150 in accordance with the present invention.

It will be clear to the skilled person that the processing means 720, 730 as used in the above apparatus may comprise any one of general purpose processors, application specific instruction processors, or even dedicated integrated circuits. Moreover, this hardware, in so far as it is programmable, should be complemented with suitable software.

Variations in the partitioning over processing means are envisaged to be well in the scope of the present invention. For example the shot-cut detection, the first estimate determination, as well as the actual mapping of the first depth-related information onto the second depth-related information may be implemented on a single general purpose processor without departing from the scope of the present invention.

Figure 8:
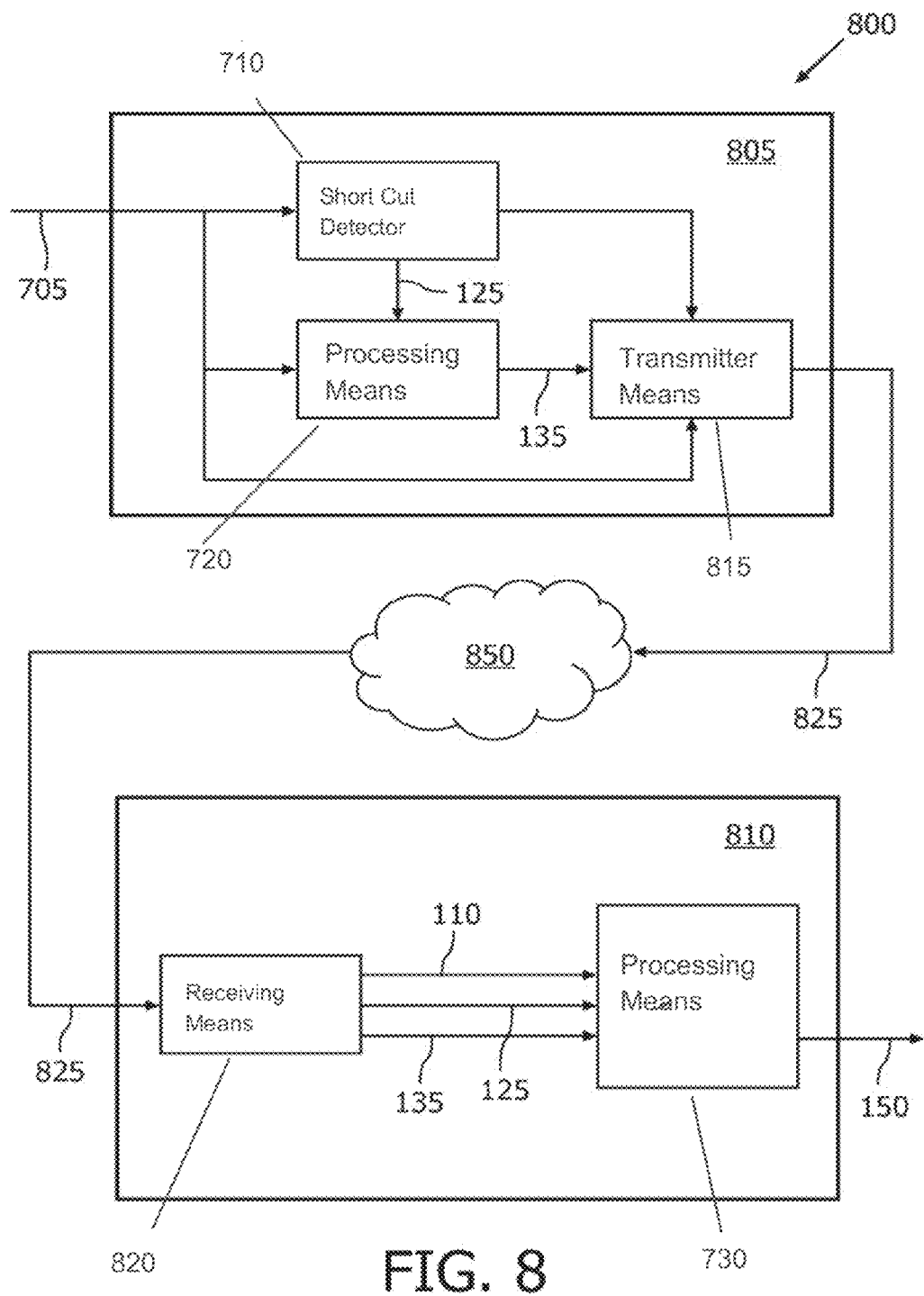
FIG. 8 shows a system and a signal according to the present invention.

FIG. 8 shows a system 800 and a signal 825 according to the present invention. The system 800 is arranged to process a signal 705 comprising an image sequence and first depth-related information 110 associated therewith. Processing signal 705 comprises mapping first depth-related information 110 of respective images of a shot of the image sequence onto corresponding second depth-related information 150.

The system comprises a first apparatus 805 that uses the signal 705 as input and transmits a signal 825 as output, the signal 825 comprising first depth-related information 110, shot information 125, and a first estimate 135 of a characteristic of the distribution of depth-related information associated with at least one image from the shot.

In order to transmit signal 825, the first apparatus 805 comprises transmitter means 815 that enable the first apparatus 805 to transmit said information over a wired or wireless network 850. Such networks may include e.g. an IEEE1394 network, a Wireless LAN (IEEE 802.11), the Internet, a HDMI connection, or another type of digital transmission medium.

Conversely, the second apparatus 810 comprises receiver means 820 arranged to receive signal 825. Although in FIG. 8 the first depth-related information 110, the shot information 125, and the first estimate 135 are grouped within a single channel, it will be clear to those skilled in the art that these signals may be transported using different physical and/or logical channels, provided that synchronization between the respective paths can be re-established at by the receiver means.

The second apparatus 810 further comprises processing means 730 which are arranged to perform the actual mapping in accordance with the present invention. As indicated by the embodiments in the FIGS. 7A, 7B, and 8, the present invention may be implemented so as to be either distributed over a system or entirely comprised within an apparatus. Moreover, an apparatus according to the present invention may also be advantageously incorporated in e.g. an autostereoscopic display or in a set top box arranged to provide input signals for an autostereoscopic display.

Alternatively, the present invention may also be applied in the realm of off-line 3D content creation, wherein the present invention is used to generate metadata for use in conjunction with an image sequence and/or first depth related information. Alternatively, this metadata may be stored onto a data carrier together with the image sequence and the associated first depth-related information in order to enable an improved depth-perception when this content is rendered on an autostereoscopic display fitted with an apparatus 745 as shown in FIG. 7B.

Although the present invention is primarily explained with regard to autostereoscopic displays, the present invention may also be of use in other applications that make use of depth maps and disparity maps such as in image compression and/or image inspection. As indicated above, this includes the generation of metadata for content that can be used during rendering of said content.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

Use of the verb "to comprise" and its conjugations does not exclude the presence of elements other than those stated in the claims. Use of the article "a" or "an" preceding an element does not exclude the presence of a plurality of such elements.

The invention claimed is:

1. A method of processing first depth-related information associated with an image sequence comprising:
   mapping first depth-related information of respective images of a shot of the image sequence on corresponding second depth-related information using a first estimate of a characteristic of a distribution of first depth-related information associated with at least one image from the shot, the mapping comprising:
      determining a range of interest of the first depth-related information based at least in part by the first estimate, wherein an amount of variation in the mapping for respective images in temporal proximity in the shot is based on a predetermined threshold value, said threshold value being determined by a type of said shot; and
      allocating said determined range of interest of said first depth-related information onto a full range of interest of said second depth related information.

2. The method of claim 1, wherein the second depth-related information is first disparity information.

3. The method of claim 1, wherein the first depth-related information is one of second disparity information and second depth information.

4. The method of claim 1, wherein a maximum amount of variation in the respective mapping used for adjacent images within the shot is upper bounded by the predetermined threshold.

5. The method of claim 4, wherein the predetermined threshold is zero.

6. The method of claim 1, wherein the first estimate represents an estimate of a characteristic of the distribution of first depth-related information for all images in the shot.

7. The method of claim 1, wherein the first estimate is based on temporally filtered first depth-related information associated with at least one image from the shot.

8. The method of claim 1, wherein the first estimate is based on weighted first depth-related information associated with at least one image from the shot, the weighting factors based on reliability information indicative of the reliability of the first depth-related information.

9. The method of claim 1, the method further comprising:
   obtaining classifying information for the shot; and
   adapting the mapping for respective images of the shot based on the classifying information.

10. The method of claim 1, wherein the first depth-related information used for determining the first estimate are located in a first image region; and wherein the method further comprises reducing the probability of window violations using a second estimate, the second estimate being an estimate of a characteristic of the distribution of first depth-related information associated with at least one image from the shot, the first depth-related information used for determining the second estimate located in a second image region near an image border.

11. The method of claim 10, wherein reducing the probability of window violations comprises contracting the range of first depth-related information produced by the mapping.

12. An apparatus for processing first depth-related information associated with an image sequence, comprising mapping first depth-related information of respective images of a shot of the image sequence on corresponding second depth-related information, the apparatus comprising:
   processing means arranged to:
      map the first depth-related information of respective images of a shot of the image sequence on the corresponding second depth-related information using a first estimate of a characteristic of the distribution of first depth-related information associated with at least one image from the shot, the mapping comprising:
   determining a range of interest of the first depth-related information based at least in part by the first estimate, wherein an amount of variation in the mapping for respective images in temporal proximity in the shot is based on a predetermined threshold value, said threshold value being determined by a type of said shot allocating said determined range of interest of said first depth-related information on a full range of interest of said second depth related information.

13. A system for processing first depth-related information associated with an image sequence, comprising mapping first depth-related information of respective images of a shot of the image sequence on corresponding second depth related information, the system comprising:
   a first apparatus comprising:
      obtaining means arranged to obtain shot information classifying multiple sequential images from the image sequence as a shot
      obtaining means arranged to obtain a first estimate of a characteristic of the distribution of first depth-related information associated with at least one image from the shot;
      transmitter means arranged to send the shot information and the first estimate over a network; and
   a second apparatus comprising:
      receiver means arranged to receive the shot information and the first estimate-from a network and
      processing means arranged to map the first depth-related information of respective images of the shot on the corresponding second depth-related information using the first estimate, the mapping adapting the first depth-related information by enhancing the dynamic range of a range of interest of first depth-related information defined at least in part by the first estimate, and wherein the amount of variation in the mapping for respective images in temporal proximity in the shot is based on a predetermined threshold value, said threshold value being determined by a type of said shot.

14. A non-transitory computer readable medium comprising:

mapping first depth-related information associated with an image-sequence;

forming shot information by classifying multiple images from the image sequence as a shot;

creating a first estimate of a characteristic of the distribution of first depth-related information values associated with at least one image from the shot, the first depth-related information of respective images of the shot mapped onto a corresponding second depth-related information using the first estimate, the mapping adapting the first depth-related information by enhancing the dynamic range of a range of interest of the first depth-related information defined at least by the first estimate, and wherein the amount of variation in the mapping for respective images in temporal proximity in the shot is based on a predetermined threshold value, said threshold value being determined by a type of said shot.

15. A computer program product stored on a tangible computer readable medium, said program product to be loaded into a computer arrangement, said product comprising instructions, which when accessed by the computer arrangement causes the computer arrangement to:

map said first depth-related information of respective images of a shot of the image sequence on corresponding depth-related information on corresponding second depth-related information using a first estimate, the mapping comprising:

determining a range of interest of the first depth-related information based at least in part by the first estimate, wherein an amount of variation in the mapping for respective images in temporal proximity in the shot is based on a predetermined threshold value, said threshold value being determined by a type of said shot; and allocating said determined range of interest of said first depth-related information onto a full range of interest of said second depth related information.

16. An apparatus for processing first depth-related information associated with an image sequence, comprising mapping first depth-related information of respective images of a shot of the image sequence on corresponding second depth-related information, the apparatus comprising:

processing means arranged to:

map the first depth-related information of respective images of a shot of the image sequence on the corresponding second depth-related information using a first estimate of a characteristic of the distribution of first depth-related information associated with at least one image from the shot, the mapping comprising:

determining a range of interest of the first depth-related information based at least in part by the first estimate, wherein an amount of variation in the mapping for respective images in temporal proximity in the shot is based on a predetermined threshold value, said threshold value being determined by a type of the shot, and allocating said determined range of interest of said first depth-related information onto a full range of interest of said second depth related information.

17. An apparatus for processing first depth-related information associated with an image sequence, comprising mapping first depth-related information of respective images of a shot of the image sequence on corresponding second depth-related information, the apparatus comprising:

processing means arranged to:

map the first depth-related information of respective images of a shot of the image sequence on the corresponding second depth-related information using a first estimate of a characteristic of the distribution of first depth-related information associated with at least one image from the shot, the mapping adapting the first depth-related information by enhancing a dynamic range of a range of interest of first depth-related information defined at least in part by the first estimate, and wherein the amount of variation in the mapping for respective images in temporal proximity in the shot is based on a predetermined threshold value, said threshold value being determined by a type of said shot, and wherein the maximum amount of variation in the respective mapping used for adjacent images within the shot is upperbounded by the predetermined threshold.

18. An apparatus for processing first depth-related information associated with an image sequence, comprising mapping first depth-related information of respective images of a shot of the image sequence on corresponding second depth related information, the apparatus comprising:

processing means arranged to:

map the first depth-related information of respective images of a shot of the image sequence on the corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and wherein the amount of variation in the mapping for respective images in temporal proximity in the shot is based on a predetermined threshold value, said threshold value being determined by a type of said shot, and wherein the first estimate represents an estimate of a characteristic of the distribution of first depth-related information for all images in the shot.

19. An apparatus for processing first depth-related information associated with an image sequence, comprising mapping first depth-related information of respective images of a shot of the image sequence on corresponding second depth related information, the apparatus comprising:

processing means arranged to:

map the first depth-related information of respective images of a shot of the image sequence on the corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and wherein the amount of variation in the mapping for respective images in temporal proximity in the shot is based on a predetermined threshold value, said threshold value being determined by a type of the shot, and wherein the first estimate is based on weighted first depth-related information associated with at least one image from the shot, the weighting factors based on reliability information indicative of the reliability of the first depth-related information.

20. An apparatus for processing first depth-related information associated with an image sequence, comprising mapping first depth-related information of respective images of a shot of the image sequence on corresponding second depth related information, the apparatus comprising:

processing means arranged to:
map the first depth-related information of respective images of a shot of the image sequence on the corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and wherein an amount of variation in the mapping for respective images in temporal proximity in the shot is based on a predetermined threshold value, said threshold value being determined by a type of the shot, and obtain classifying information for the shot; and adapt the mapping for respective images of the shot based on the classifying information.

21. An apparatus for processing first depth-related information associated with an image sequence, comprising mapping first depth-related information of respective images of a shot of the image sequence on corresponding second depth related information, the apparatus comprising:

processing means arranged to:
map the first depth-related information of respective images of a shot of the image sequence on the corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and wherein the amount of variation in the mapping for respective images in temporal proximity in the shot is based on a predetermined threshold value, said threshold value being determined by a type of the shot, and wherein the first depth-related information used for determining the first estimate are located in a first image region, and reduce a probability of window violations using a second estimate, the second estimate being an estimate of a characteristic of the distribution of first depth-related information associated with at least one image from the shot, the first depth-related information used for determining the second estimate located in a second image region near an image border.

22. An apparatus for processing first depth-related information associated with an image sequence, comprising mapping first depth-related information of respective images of a shot of the image sequence on corresponding second depth-related information, the apparatus comprising:

processing means arranged to:
map the first depth-related information of respective images of a shot of the image sequence on the corresponding second depth-related information using a first estimate of a characteristic of the distribution of first depth-related information associated with at least one image from the shot, the mapping adapting the first depth-related information by enhancing the dynamic range of a range of interest of first depth-related information defined at least in part by the first estimate, and wherein the amount of variation in the mapping for respective images in temporal proximity in the shot is based on a predetermined threshold value, said threshold value being determined by a type of said shot, and reduce a probability of window violations by contracting the range of first depth-related information produced by the mapping.

23. The method of claim 1, wherein the second depth-related information is first depth information.

* * * * *